(12) United States Patent
Yauchi et al.

(10) Patent No.: US 10,189,137 B2
(45) Date of Patent: Jan. 29, 2019

(54) TOOL SHAPE MEASURING APPARATUS

(71) Applicant: BIG DAISHOWA CO., LTD., Osaka (JP)

(72) Inventors: Masataka Yauchi, Osaka (JP); Kouichi Uemura, Osaka (JP); Reina Oohashi, Osaka (JP); Shunsuke Kumasaki, Osaka (JP); Akihito Funashoku, Osaka (JP)

(73) Assignee: Big Daishowa Co., Ltd., Osaka (JP)

( * ) Notice: Subject to any disclaimer, the term of this patent is extended or adjusted under 35 U.S.C. 154(b) by 0 days.

(21) Appl. No.: 15/569,544

(22) PCT Filed: Jun. 30, 2015

(86) PCT No.: PCT/JP2015/068760
§ 371 (c)(1),
(2) Date: Oct. 26, 2017

(87) PCT Pub. No.: WO2017/002186
PCT Pub. Date: Jan. 5, 2017

(65) Prior Publication Data
US 2018/0297166 A1    Oct. 18, 2018

(51) Int. Cl.
| | | |
|---|---|---|
| *G01B 11/00* | (2006.01) | |
| *B23Q 17/22* | (2006.01) | |
| *B23Q 17/24* | (2006.01) | |
| *G01B 11/28* | (2006.01) | |
| *G01B 11/24* | (2006.01) | |

(52) U.S. Cl.
CPC ......... *B23Q 17/2457* (2013.01); *B23Q 17/22* (2013.01); *B23Q 17/24* (2013.01);
(Continued)

(58) Field of Classification Search
CPC ........ B23Q 17/20; B23Q 17/22; B23Q 17/24; B23Q 11/2457; G01B 11/00; G01B 11/24;
(Continued)

(56) References Cited

U.S. PATENT DOCUMENTS

| | | | | |
|---|---|---|---|---|
| 2003/0106228 A1* | 6/2003 | Fujishima | .......... | B23Q 17/2233 33/502 |
| 2008/0184570 A1* | 8/2008 | Buttau | .................. | B23B 31/028 33/201 |

(Continued)

FOREIGN PATENT DOCUMENTS

| | | |
|---|---|---|
| JP | H06109940 A | 4/1994 |
| JP | 2005052910 A | 3/2005 |

(Continued)

OTHER PUBLICATIONS

International Search Report dated May 24, 2016 in PCT/JP2016/056062.

(Continued)

*Primary Examiner* — Sang H Nguyen
(74) *Attorney, Agent, or Firm* — Dillworth & Barrese, LLP

(57) ABSTRACT

There is provided a tool shape measuring apparatus that allows detection of shape abnormality in a tool having a plurality of cutting edges with a simple configuration. A light receiving section 6 includes a light receiving face 9 perpendicular to an optical axis 6b of a light receiving lens 6a. In the light receiving face 9, there are disposed a plurality of line sensors 8 arranged in different directions from each other, each line sensor having a plurality of sensor elements arranged in one direction. The line sensor 8 is disposed across a first area not reached by the irradiation light L as being completely blocked by the tool 4, a second area disposed adjacent the first area and reached by the irradiation light L with a portion thereof being blocked, and a third area disposed adjacent the second area and reached by the irradiation light L not blocked at all. A calculation section 21 checks change occurring in output states of the line sensor 8 associated with rotation of the tool 4 and specifies a contour position of the tool 4 based on a center position in (Continued)

the second area when the number of the sensor elements included in the second area becomes minimal.

5 Claims, 8 Drawing Sheets

(52) U.S. Cl.
CPC ........ *G01B 11/002* (2013.01); *G01B 11/2433* (2013.01); *G01B 11/28* (2013.01)

(58) Field of Classification Search
CPC ... G01B 11/002; G01B 11/28; G01B 11/2433; B24B 3/24
See application file for complete search history.

(56) References Cited

U.S. PATENT DOCUMENTS

| | | | |
|---|---|---|---|
| 2010/0063612 A1* | 3/2010 | Wang | B23Q 17/20 700/110 |
| 2011/0265835 A1* | 11/2011 | Sato | B23Q 17/0914 134/56 R |
| 2013/0176429 A1* | 7/2013 | Kurahashi | B23Q 17/2457 348/142 |

FOREIGN PATENT DOCUMENTS

| | | | |
|---|---|---|---|
| JP | 2005224901 A | * | 8/2005 |
| JP | 2006110680 A | | 4/2006 |
| JP | 2006343128 A | | 12/2006 |
| JP | 2007049489 A | | 2/2007 |
| JP | 2008082748 A | | 4/2008 |
| JP | 2008304292 A | | 12/2008 |
| JP | 2010019559 A | | 1/2010 |
| JP | 2010052053 A | | 3/2010 |
| JP | 2012086350 A | | 5/2012 |
| JP | 2012108037 A | | 6/2012 |
| JP | 2013120175 A | | 6/2013 |
| JP | 2013174549 A | | 9/2013 |
| WO | 2017002395 A1 | | 1/2017 |

OTHER PUBLICATIONS

Written Opinion dated May 24, 2016 in PCT/JP2016/056062.
Written Opinion dated Aug. 25, 2015 in PCT/JP2015/068760.
International Search Report dated Aug. 25, 2015.

* cited by examiner

TOOL SHAPE MEASURING APPARATUS

TECHNICAL FIELD

The present disclosure relates to a tool shape measuring apparatus for measuring shape of a cutting edge of the tool.

BACKGROUND ART

PTL 1 discloses an imaging apparatus configured to image an imaging target such as a tool and to effect an image processing on an acquired image, thereby to detect the shape of the imaging target. With this imaging apparatus in operation, light is irradiated from a light projecting section onto the tool and the light passing through a lens is detected by an area sensor provided in the light receiving section. The area sensor has a configuration of sensor elements arranged in form of a rectangular face. With this, the tool as a whole can be imaged for allowing measurement of its shape.

PTL 2 discloses a tool measuring apparatus using both an area sensor and a line sensor in combination. The shape of a tool is measured by the area sensor. On the other hand, the line sensor is used for detecting whether the tool has advanced to a position appropriate for the field of vision of the area sensor, which vision constitutes the measurement area thereof. When a detection signal of the line sensor is outputted to a machining center, the machining center stops the advancing operation of the tool, thus keeping the tool in the measurement area.

CITATION LIST

Patent Literature

PTL 1: Japanese Unexamined Patent Application Publication 2007-49489
PTL 2: Japanese Unexamined Patent Application Publication 2012-86350

SUMMARY

Technical Problem

With use of the imaging apparatuses of PTLs 1 and 2, the general shape of the tool having a plurality of cutting edges can be measured. However, since the measurement of the shape of the tool is effected generally while the tool is being rotated, if one of the plurality of cutting edges is chipped, detection of such chipping is sometimes not possible. This is because when the tool is being rotated, no change occurs in the tool contour even if one of the cutting edges is chipped.

In view of the above-described state of the art, there is a need for a tool shape measuring apparatus that allows detection of shape abnormality in a tool having a plurality of cutting edges with a simple configuration.

Solution to be Problem

According to a characterizing feature of a tool shape measuring apparatus relating to the present invention, there is provided a tool shape measuring apparatus configured to measure a shape of a tool having a plurality of cutting edges in an outer circumference thereof, the apparatus comprising:

a light projecting section for emitting an irradiation light to the tool;

a light receiving section disposed opposite the light projecting section across the tool therebetween, the light receiving section being configured to receive the irradiation light through a lens, the light receiving section being set at a position where a contour of the tool is imaged by the lens;

a calculation section for calculating a contour position of the tool based on a detection signal of the light receiving section;

wherein the light receiving section includes a light receiving face perpendicular to an optical axis of the lens, and in the light receiving face, there are disposed a plurality of line sensors arranged in different directions from each other, each line sensor having a plurality of sensor elements arranged in one direction;

wherein the respective line sensor is disposed across a first area not reached by the irradiation light as being completely blocked by the tool, a second area disposed adjacent the first area and reached by the irradiation light with a portion thereof being blocked, and a third area disposed adjacent the second area and reached by the irradiation light not blocked at all; and wherein the calculation section checks change occurring in output states of the line sensor associated with rotation of the tool and specifies a contour position of the tool based on a center position in the second area when the number of the sensor elements included in the second area becomes minimal. (See FIG. 4(a), (c))

With the above-described configuration, the lens and the line sensors are arranged such that a captured image of the tool contour may be formed at the position of the line sensors. Namely, of the cutting edges of the tool, the contour of a cutting edge located on a plane including the rotational axis and parallel with the line sensor is imaged on the light receiving face on which the line sensors are provided. Now, if the cutting edge contour intersects the line sensor on the light receiving face, of the sensor elements constituting the line sensor, the irradiation light does not reach the sensor element which is positioned at a portion shadowed by the cutting edge (the first area). That is, no electromotive force is generated in this sensor element present in the first area. On the other hand, of the sensor elements, the sensor element present at a portion not shadowed by the cutting edge (the third area), is reached by the irradiation light without any blockage. So, a maximal electromotive force is generated in this sensor element.

Further, of the sensor elements, between those contained in the first area and those contained in the third area, there is present a sensor element(s) that receives the irradiation light with a portion thereof being blocked by the tool (the second area). For instance, in the case of the sensor elements contained in the second area, when the tool contour is imaged on the light receiving face, there can be present such sensor element whose half portion is impinged with the light and whose remaining portion thereof is not impinged by the irradiation light as being shadowed by the tool. In this case, the electromotive force generated in such sensor element as above will have an intermediate value between the (zero) electromotive force from the sensor element contained in the first area and the electromotive force from the sensor element contained in the third area.

In case the extending direction of the line sensor is perpendicular to the extending direction of the tool contour, the number of the sensor elements overlapped with the imaged tool contour is minimal. Whereas, the greater the parallelism between the extending direction of the line sensor and the extending direction of the tool contour, the greater the number of sensor elements overlapped with the imaged tool contour; namely, the greater the number of sensor elements receiving only a portion of the irradiation light, thus the greater the extension of the second area. In this way, the greater the perpendicularity of the angle of intersection between the line sensor and the tool contour, the fewer the number of sensor elements classified as belonging in the second area, thus the easier the specification of the position of the tool contour. Here, the position of the tool contour will be set as the center position of those sensor elements contained in the second area.

Further, the position of the measurement target to be imaged on the light receiving section is set at a portion which is present at an equal distance from the rotational axis of the tool as seen from the light receiving section. The position of the measurement target is the contour of the tool. Thus, during rotation of the tool, when a particular cutting edge of this tool arrives at the position at an equal distance from the rotational axis, namely, at the position most distant from the rotational axis, the contour of the cutting edge will be imaged on the light receiving section. Under this state, the contour of the cutting edge is measured.

On the other hand, when a rotational phase of the tool is located at a certain position before/after the measurement position, the image of the cutting edge formed on the light receiving face will be out of focus. Under such out-of-focus state, the light through the lens will not be sufficiently converged, but diffused. As a result, the number of those sensor elements classified as belonging in the second area becomes large.

In this way, with the inventive configuration above, the image of the cutting edge will be most in focus when the contour of the cutting edge is present at an equal distance from the rotational axis relative to the light receiving face. Then, the position of the sensor element located at the center of those sensor elements classified as belonging in the second area is the position of the tool contour.

Further, with the tool shape measuring apparatus having the inventive configuration, a plurality of line sensors are disposed to extend in directions different from each other. Therefore, in the case e.g. of a tool, like an end mill, having cutting face extending in the direction perpendicular to the rotational axis and a further cutting face extending parallel with the rotational axis, the contour of a predetermined portion thereof can be measured with using either one of these line sensors.

According to a further characterizing feature of the tool shape measuring apparatus relating to the present invention, the line sensors include a first line sensor disposed parallel with the rotational axis of the tool and a second line sensor disposed at a right angle relative to the first line sensor about a position adjacent one of opposed ends of the first line sensor, which one end is closer to a base end portion of the tool.

The gray scale of the light detected by the line sensors varies most in the direction at a right angle relative to the cutting edge contour. For determination of a tool whose leading end has an outer shape extending in the radial direction and the axial direction, it is advantageous to dispose line sensors along two directions. In such case, if the line sensors are disposed perpendicularly to each other as provided in the above-described arrangement, even if one line sensor is positioned in a tangential direction of the tool contour, the other line sensor is positioned in the perpendicular direction. Therefore, there can be secured a maximal area of contour measurable by the line sensor in either one of the two directions.

Especially, a lateral contour of a tool is often parallel with the rotational axis. In this case too, with the arrangement of the embodiment above, the second line sensor is disposed at a right angle relative to the rotational axis. Also, the other, i.e. the first line sensor, can be disposed to intersect an end face of the tool at a large angle close to the right angle. Therefore, with this arrangement, the tool contour can be measured even more accurately.

According to a further characterizing feature of the tool shape measuring apparatus relating to the present invention:

the apparatus further comprises a phase detection section for recognizing a rotational phase of the tool;

a contour position of each one of the plurality of cutting edges is measured at different timings before and after a machining operation and a difference between the two measured contour positions calculated based on results of the measurements is set as a runout width; and if the runout width exceeds a preset threshold value, the shape of the cutting edge is determined abnormal.

By comparison of runout width between differing timings for each cutting edge as provided in the above arrangement, comparison between state of the cutting edge before and after the machining operation is possible. In doing this, since the shape measurement is effected for each cutting edge, shape abnormality if any of cutting edges can be discovered timely.

According to a still further characterizing feature of the tool shape measuring apparatus relating to the present invention:

a contour position of each one of the plurality of cutting edges is measured at two positions along the extending direction of the cutting edge and a difference between the two measured contour positions calculated based on results of the measurements is set as a runout width; and if the runout width exceeds a preset threshold value, the shape of the cutting edge is determined abnormal.

By comparison of runout width between multiple positions in the tool as provided in the above-described arrangement, comparison is made possible e.g. between the shape of an unused portion distant from the leading end of the tool and a shape of a portion already used for machining operation in the leading end portion of the tool. Therefore, without need of measurements at differentiated timings, shape abnormality of tool can be detected easily.

According to a still further characterizing feature of the tool shape measuring apparatus relating to the present invention:

for the calculation of the contour position of the tool by the calculation section;

there is provided an input section for inputting a number of teeth of the tool;

the calculation section calculates a measurement cycle for each cutting edge in accordance with a preset measurement rotational speed of the tool and the number of teeth thereof;

the line sensors measure a movement of the contour position;

at a timing when the contour position moves to one side in a longitudinal direction of the line sensors and then reverses in the opposite direction, a position of this reversal is set as a determined contour position;

a measurement timing is set such that with reference to a rotational phase of the tool at the timing of acquisition of the determined contour position, the measurement cycle is shifted by a half cycle to provide a switchover phase for measurement starting and measurement ending;

the determined contour position is obtained at least one time for each one of the plurality of cutting edges; and of the determined contour positions of the respective cutting edge, a runout of the tool is measured based on a difference between a maximal contour position most distant from the rotational axis of the tool and a minimal contour position closest to the rotational axis.

With the measurement of the contour position of the cutting edge with using the line sensors as provided in the above-described inventive configuration, there is no need for effecting image processing using two-dimensional image data as wound be done in the case of the conventional measuring apparatus, so the calculation load can be reduced extremely. Further, thanks to the reduced calculation load, the calculation of the contour position of the cutting edge can be effected very speedily and the period for the measurement process can be reduced by increasing the rotational speed of the tool. Moreover, the measurement of the contour position can be made for a desired number of rotations for the cutting edge having a predetermined number of teeth, so the measurement accuracy can be increased easily.

DESCRIPTION OF EMBODIMENTS

Next, an embodiment of the present invention will be explained with reference to the drawings.
[General Configuration]

Figure 1:
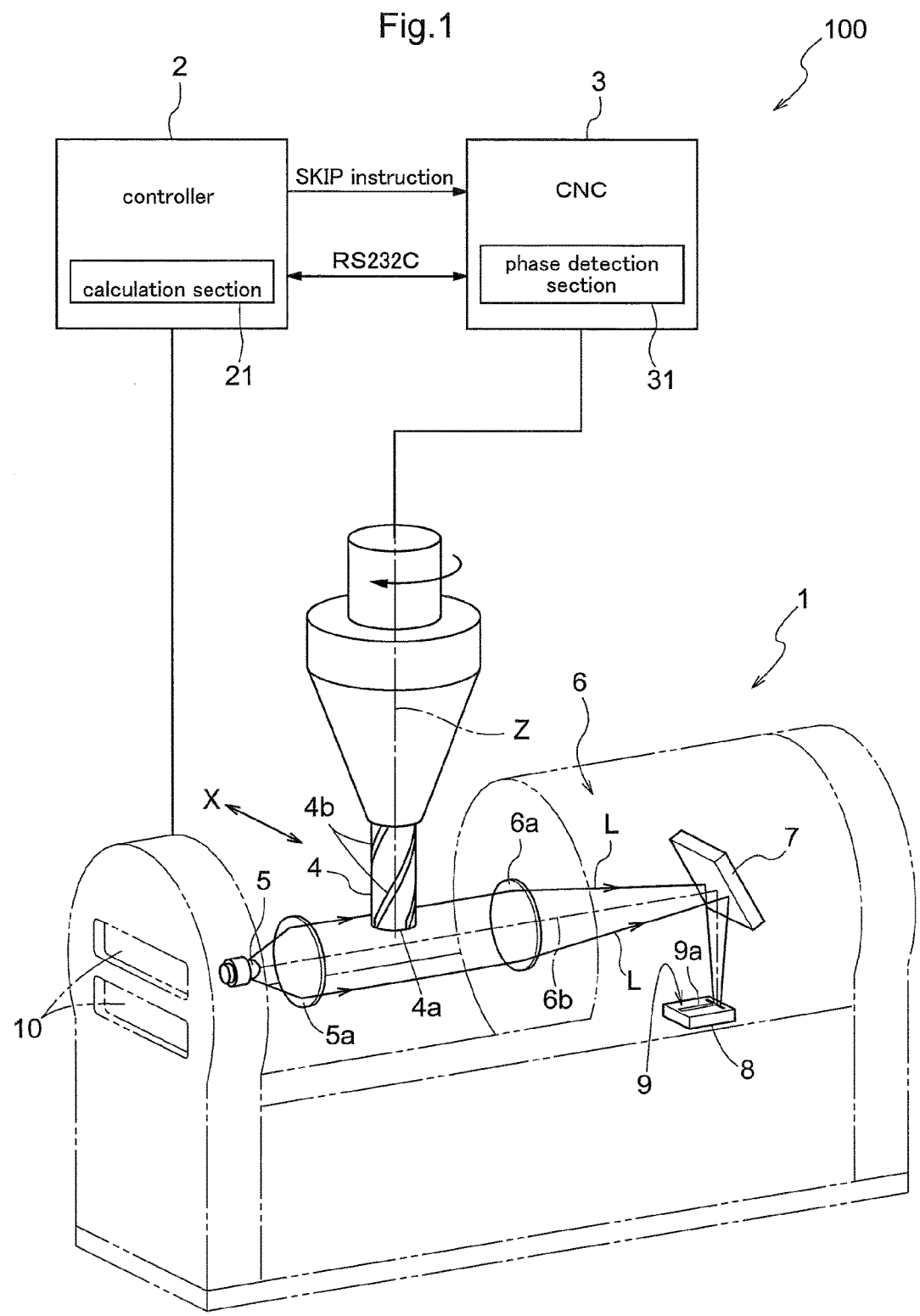
FIG. 1 is a schematic of a tool shape measuring apparatus provided in a machining center.

A tool shape measuring apparatus 100 is for use in shape measurement of a precision machining tool such as a boring drill, a milling cutter, having a plurality of cutting edges in its outer circumference, for instance. As shown in FIG. 1, the tool shape measuring apparatus 100 consists essentially of an imaging section 1 and a controller 2. The imaging section 1 is mounted to a machine tool 3 of the computerized numerical control type (CNC), to which a tool 4 is attached.

The imaging section 1 includes a light projecting section 5 for emitting an irradiation light L onto the tool 4, a light receiving section 6 disposed opposite the light projecting section 5 across the tool 4 therebetween, and a light projecting lens 5a for causing the light irradiated from the light projecting section 5 to be converged on the side of the tool 4. The light projecting section 5 is comprised of light emitting diodes (LED), etc. On the opposite side of the light projecting lens 5a across the tool 4, there is provided a light receiving lens 6a for imaging (capturing an image of) a contour of the tool 4. The light (or beam) converged by the light receiving lens 6a is bent by a mirror 7 to form an image on the light receiving section 6 having a line sensor 8. The line sensor 8 is formed of a plurality of sensor elements 81 aligned along one direction. Further, the mirror 7 is capable of optical axis adjustment in case the optical axis of the light receiving lens 6a is offset relative to the line sensor 8.

The position of the line sensor 8 is set such that of the surface shape of the tool 4, a captured image of a portion thereof present at an equal distance from the line sensor 8 to a rotational axis Z of the tool 4 may be focused by the light receiving lens 6a. The depth of focus of the light receiving lens 6a is about 0.1 mm for instance. An image of a cutting edge 4b of the tool 4 is projected in enlargement on the light receiving section 6 by the light receiving lens 6a. With this arrangement, a contour position of the tool 4 can be discriminated e.g. by a precision of about 1 μm in the direction perpendicular to the optical axis.

When the line sensor 8 receives the light, an electromotive force according to the luminance (light/shade) of the light is generated therein. Then, a detection signal based on this electromotive force is generated and this detection signal is transmitted to a calculation section 21 provided in the controller 2. The calculation section 21 effects specification of the contour position of the tool 4. Then, a value indicative of the measured contour position is displayed in a display section 10 provided in a lateral face of the imaging section 1.

Figure 2:
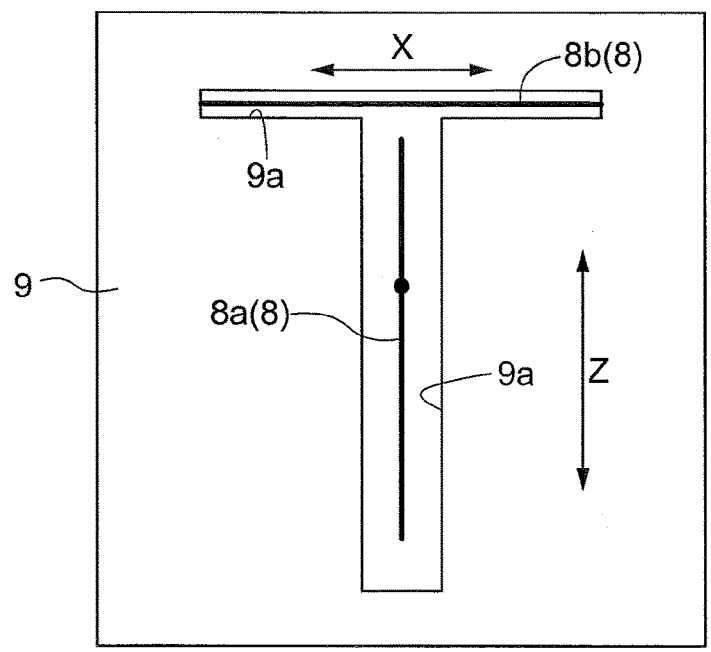
FIG. 2 is a view showing T-shaped line sensors.

As shown in FIG. 2, the light receiving section 6 includes a light receiving face 9 formed normal to the optical axis 6a of the light receiving lens 6a. In this light receiving face 9, two line sensors 8 are disposed under a posture perpendicular to each other. For instance, let us now suppose that a contour of a leading end 4a of the tool 4 is to be measured. Then, if the line sensor 8 were provided only in one direction, there could occur a situation when the posture of the line sensor 8 lies in the direction tangential to a certain portion of the leading end 4a of the tool 4. At such position, it is difficult to obtain difference of light receiving amount among the plurality of sensor elements 81 constituting the line sensor 8 (see FIG. 4), so the contour position of the leading end 4a cannot be detected accurately. Then, in order to set the direction of the line sensor 8 with an intersection angle nearly normal to the surface of the tool 4, a plurality of line sensors 8a, 8b are provided in two different directions.

In this embodiment, the line sensor 8 includes a first line sensor 8a disposed parallel with the rotational axis Z of the tool 4 and a second line sensor 8b disposed at a right angle relative to the first line sensor 8a. The second line sensor 8b is disposed adjacent one of opposed ends of the first line sensor 8a, which one end is close to the base end portion of the tool 4.

As shown in FIG. 2, the first and second line sensors 8a, 8b are disposed within a T-shaped groove 9a defined in the light receiving face 9. With this arrangement, it becomes possible to prevent light diffusedly reflected inside the imaging section 1 from being incident on the first and second line sensors 8a, 8b, so that the detection accuracy of the first and second line sensors 8a, 8b can be enhanced. Also, since the contour image of the tool 4 is projected in enlargement on the first and second line sensors 8a, 8b, the first and second line sensor 8a, 8b have high resolution. Therefore, the light receiving face 9 acting as an attaching face for the first and second line sensors 8a, 8b is formed as a precision flat surface as e.g. a metal polished surface.

Figure 3:
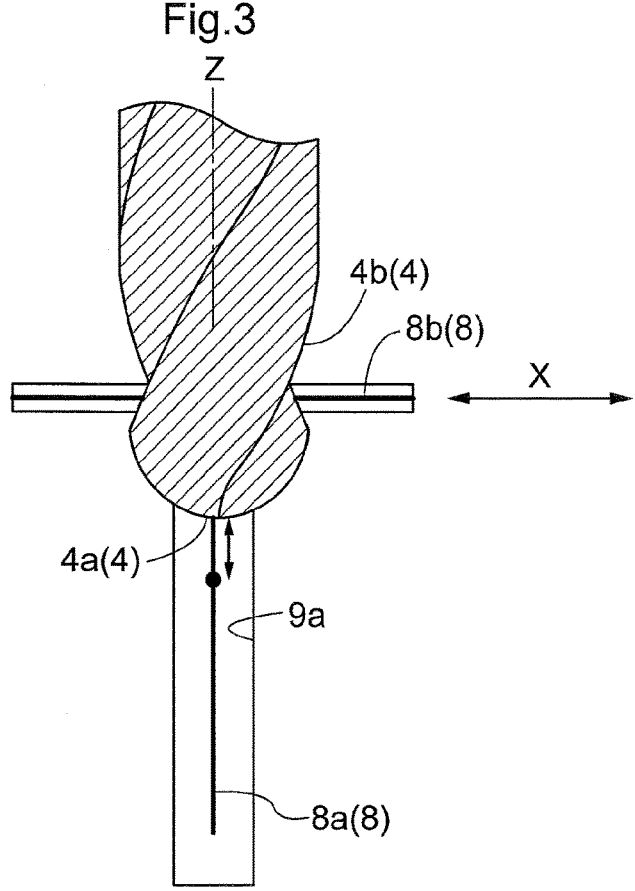
FIG. 3 is a view showing a measurement subject being overlapped with the line sensor, FIG. 4 are schematics showing output states of the line sensor.

FIG. 3 shows a condition in which the captured image of the tool 4 is overlapped with the first line sensor 8a and the second line sensor 8b. In FIG. 3, the leading end 4a of the tool 4 is positioned at approximately midpoint of the first line sensor 8*a*. The black dot shown at the approximate midpoint of the first line sensor 8*a* is a preset virtual reference position. At the time of measurement, a distance moved by the leading end 4*a* of the tool 4 past this reference position will be measured. On the other hand, the other second line sensor 8*b* intersects the tool 4 in the direction perpendicular to the rotational axis Z. Under this condition, the first line sensor 8*a* can measure the contour position of one portion, whereas the second line sensor 8*b* can measure the contour position at two portions.

Figure 4:
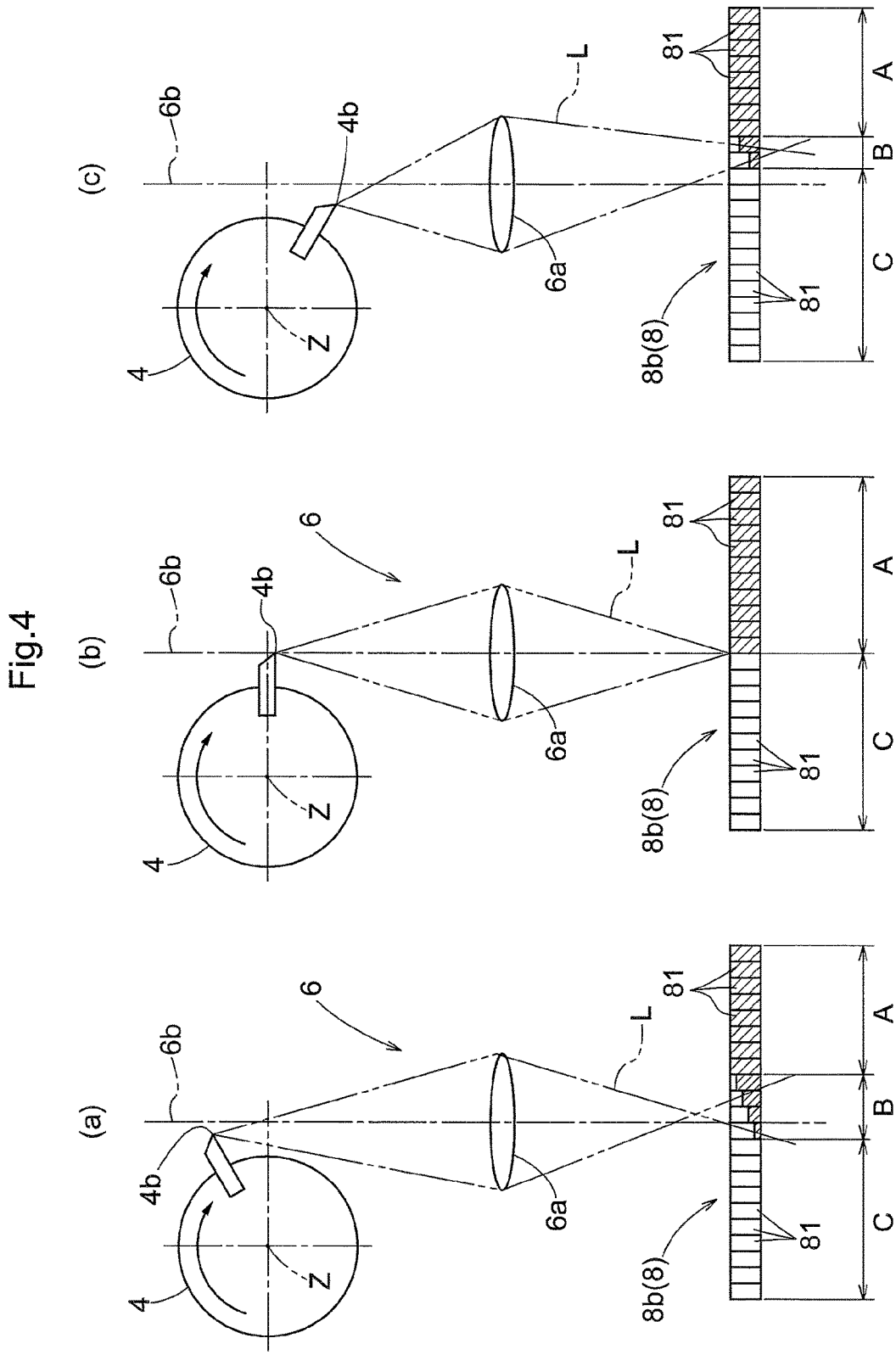

FIG. 4 shows light receiving conditions of the second line sensor 8*b*. In the order from (a) to (c) in FIG. 4, the tool 4 is rotated clockwise and imaging conditions of the respective cutting edge 4*b* on the second line sensor 8*b* are shown. FIG. 4 (*b*) at the center shows a condition in which the image of the cutting edge 4*b* is focused by the light receiving lens 6*a* on the second line sensor 8*b*. Since the depth of focus of the light receiving lens 6*a* is about 0.1 mm for instance, the image will be in focus when the cutting edge 4*b* is located within a distance of 0.1 mm before/after this position.

In FIG. 4 (*a*), since the distance from the light receiving lens 6*a* to the cutting edge 4*b* is too long, the position of the cutting edge 4*b* is offset to the left side in the illustration relative to the optical axis 6*b* of the light receiving lens 6*a*. In this case, the focus is located before the second line sensor 8*b* and on the right side of the optical axis 6*b*, thus this is a so-called out-of-focus state. Conversely, in FIG. 4 (*c*), since the distance from the light receiving lens 6*a* to the cutting edge 4*b* is too short, the position of the cutting edge 4*b* is on the left side relative to the optical axis 6*b*. In this case, the focus is located after (beyond) the second line sensor 8*b* and on the right side of the optical axis 6*b*, thus this again is a so-called out-of-focus state.

For instance, in the case of FIG. 4 (*a*), on the second line sensor 8*b*, there are formed a first area A where the irradiation light L is completely blocked by the tool 4, a second area B adjacent the first area A, reached by the irradiation light L with a portion of the light L being blocked, and a third area C adjacent the second area B and reached by the irradiation light L not being blocked at all. The detection of the contour position of the tool 4 is effected by a sensor element 81 located adjacent the focus.

As may be apparent from FIG. 4, in FIG. 4 (*b*), the image is in focus on the surface position of the second line sensor 8*b*, the sensor elements 81 will consist of either those belonging in the first area A or those belonging in the third area C. In this case, the number of the sensor elements 81 classified as belonging in the second area B becomes zero or an extremely small number.

On the other hand, in the cases of FIG. 4 (*a*) and FIG. 4 (*c*), the imaging focus of the cutting edge 4*b* is not aligned with the surface position of the second line sensor 8*b*, so these are out-of-focus states. Therefore, the light received by some sensor elements 81 are of reduced amounts, and the number of the sensor elements 81 classified as belonging in second area B will increase.

The calculation section 21, for the respective cases illustrated in FIG. 4, specifies the center position of the sensor elements 81 classified under the second area B or the border positions of the first area A and the third area C, as the "contour position" of the tool 4 at that instant.

The contour position moves in the direction perpendicular to the optical axis 6*b* of the light receiving lens 6*a* in association with rotation of the tool 4. As may be apparent from FIG. 4, under the in-focus state of the captured image of the cutting edge 4*b* (FIG. 4 (*b*)), the contour position is closest to the rotational axis Z in the longitudinal direction of the second line sensor 8*b*. When the cutting edge 4*b* is located at any other position than the above, the captured image will be out of focus and the calculated contour position will be distant from the rotational axis Z. Therefore, in this embodiment, the calculation section 21 specifies the position of the contour position closest to the rotational axis Z of the tool 4 as the "determined contour position".

[Shape Measurement of Respective Cutting Edge]

Inspection of the cutting edge 4*b* can be carried out at a desired timing. For instance, if the inspection is effected before the tool 4 is used in finishing machining operation, higher precision machining operation becomes possible. Further, the inspection can be done for each preset number of machining operations, preset for a predetermined machining work, or can be effected for each machining operation time. Further alternatively, the inspection can be done for each machining line length.

Figure 7:
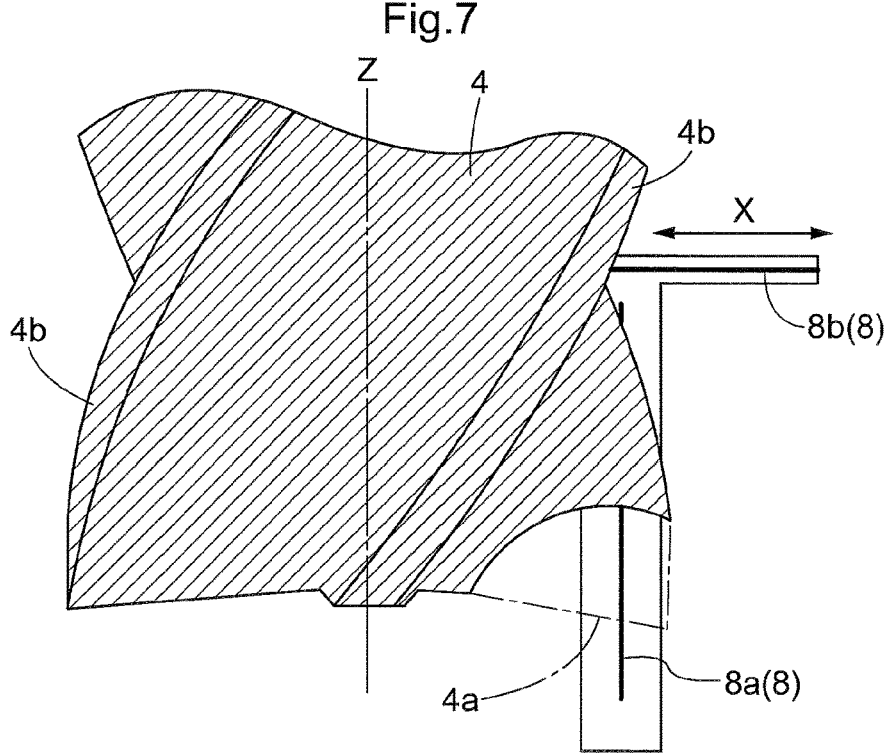
FIG. 7 is a view showing an example of axial runout determination of the cutting edge.

In the case of tool 4 having a plurality cutting edges 4*b*, there may occur a chipping of a certain cutting edge 4*b* as shown in FIG. 7. In particular, in case the diameter of the tool 4 is small, wear or chipping of the cutting edge 4*b* cannot be visually confirmed. Then, according to a tool shape measurement apparatus 100 of this embodiment, the apparatus 100 specifies a shape abnormality in each cutting edge 4*b* by the following procedure. For instance, a difference between contour positions calculated based on result of measurements of the contour positions of each one of the plurality of cutting edges (cutting edges 4*b*) done at different timings before/after machining operation is obtained as a "runout width" and when this runout width exceeds a preset threshold value, it is determined that the shape of the cutting edge is abnormal.

As shown in FIG. 1, the machine tool 3 includes a phase detection section 31 for recognizing a rotational phase of the tool 4. The phase detection section 31 recognizes the rotational phase of the tool 4 by a servo encoder provided in a machine main shaft or a mark such as a reflection seal or a cut groove attached or provided to/in the tool 4. In shape measurement of the tool 4, a reference point for measurement starting will be set in the tool 4 in the form of a mark or the like described above. Thereafter, the shape of each cutting edge 4*b* will be measured while the rotational phase of the tool 4 is being recognized by the phase detection section 31. Incidentally, the controller 2 or the machine tool 3 is provided with an input section for inputting a number of teeth of the tool 4.

Figure 5:
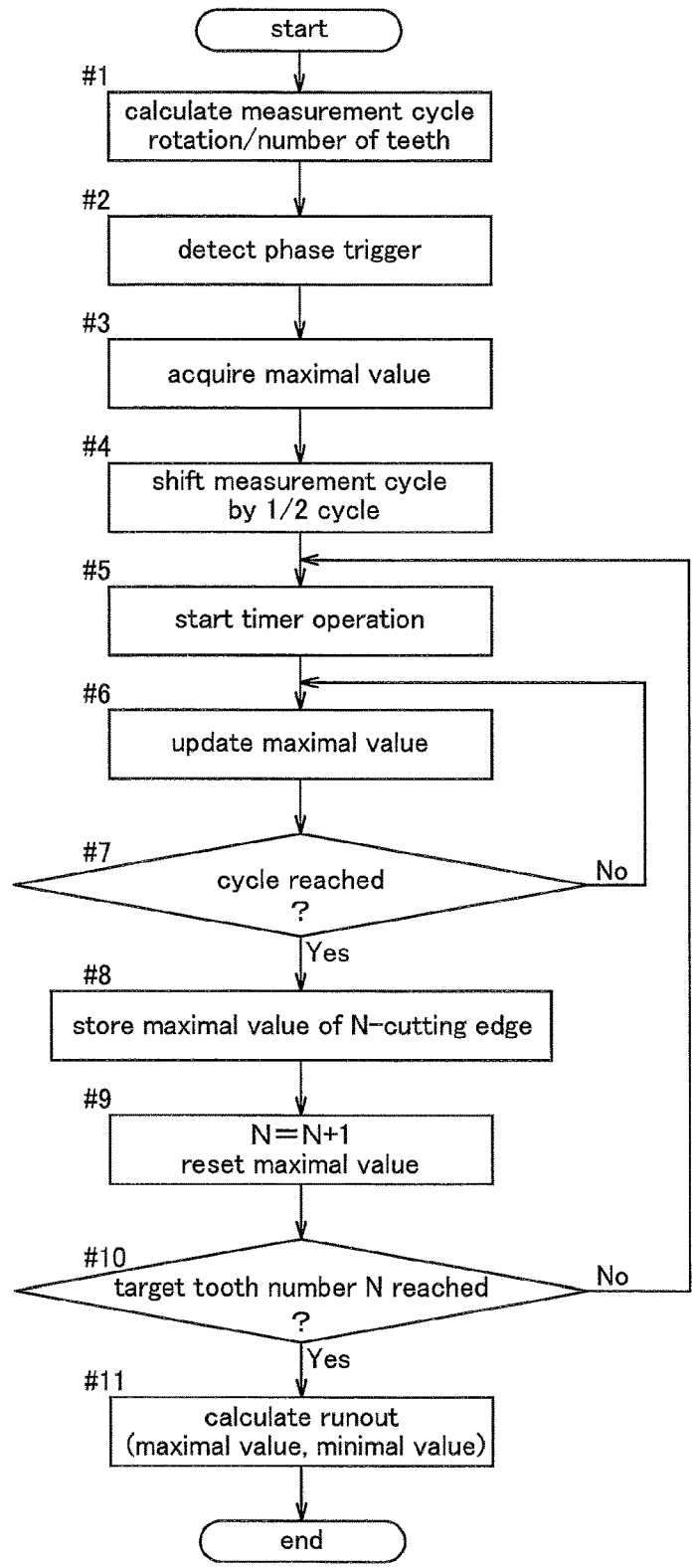
FIG. 5 is a flowchart for effecting runout determination of each cutting edge.

Next, a mode of measurement will be explained with reference to the flowchart in FIG. 5. For a plurality of cutting edges 4*b*, based on the determined reference point, the cutting edges 4*b* will be provided with respective ID numbers (e.g. 1, 2 . . . n) and while the tool 4 is rotated continuously, the shape measurement of the cutting edges 4*b* will be effected by a predetermined cycle.

At step #1, a measurement cycle is calculated. For example, let us here suppose that the tool 4 as a measurement target is rotated by 100 times/min. and the tool 4 has four cutting edges 4*b* in total. In this case, one cycle of rotation is 0.6 seconds and a measurement cycle for one cutting edge 4*b* will be 0.15 seconds.

Next, at step #2, a reference point of rotational phase of the tool 4 is determined. A step #3, a maximal value of contour position is acquired and a measurement timing of the cutting edge 4*b* is calculated. For this measurement timing, the measurement cycle is advanced by ½ (step #4). Namely, the movement of the contour position is measured by the line sensor 8*b*, and when the contour position moves to one side along the longitudinal direction of the line sensor 8b and then reverses to the opposite direction, the position of this reversal occurred will be set as a "determined contour position"; and by using the rotational phase of the tool 4 at the time of acquisition of this determined contour position as a reference, the phase obtained with shifting of the measurement cycle by half cycle is set as a "switchover phase" for measurement starting and measurement ending. In this way, the measurement timing is set. With this, in the measurement area of the measurement cycle, a maximal outer circumferential position at which the image of the cutting edge 4b is in focus of the light receiving lens 6a and areas before/after the position will be included. Therefore, with an operation of a timer (step #5), measurement of the No. 1 cutting edge 4b is started.

When the number of sensor elements 81 included in the line sensor 8 becomes smallest, thus specifying the contour position of the cutting edge 4b, at step #6, the maximal value of the contour position of the cutting edge 4b, namely, the value of the determined contour position is updated. At step #7, after completion of the measurement of No. 1 cutting edge 4b, at step #8, the number value and the determined contour position of the cutting edge 4b are stored. At step #9, the N (number) value is incremented by 1 (one) and thereafter, measurements will be effected similarly for the cutting edges 4b of Nos. 2-4 (steps #5-10).

When the predetermined number of measurements for the four cutting edges 4b are completed at step #10, at step 11, a runout width of each cutting edge 4b is calculated by comparison with the measurement data obtained before use.

The contour of the cutting edge 4b increases and decreases in repetition relative to the position of the rotational axis Z of the tool 4, in the radial direction of the tool 4 for instance. Therefore, by measuring the contour of the cutting edge 4b on one end side in the radial direction, a "runout", which is a distance from the axis of each cutting edge 4b to the contour of that cutting edge 4b, can be measured.

Figure 6:
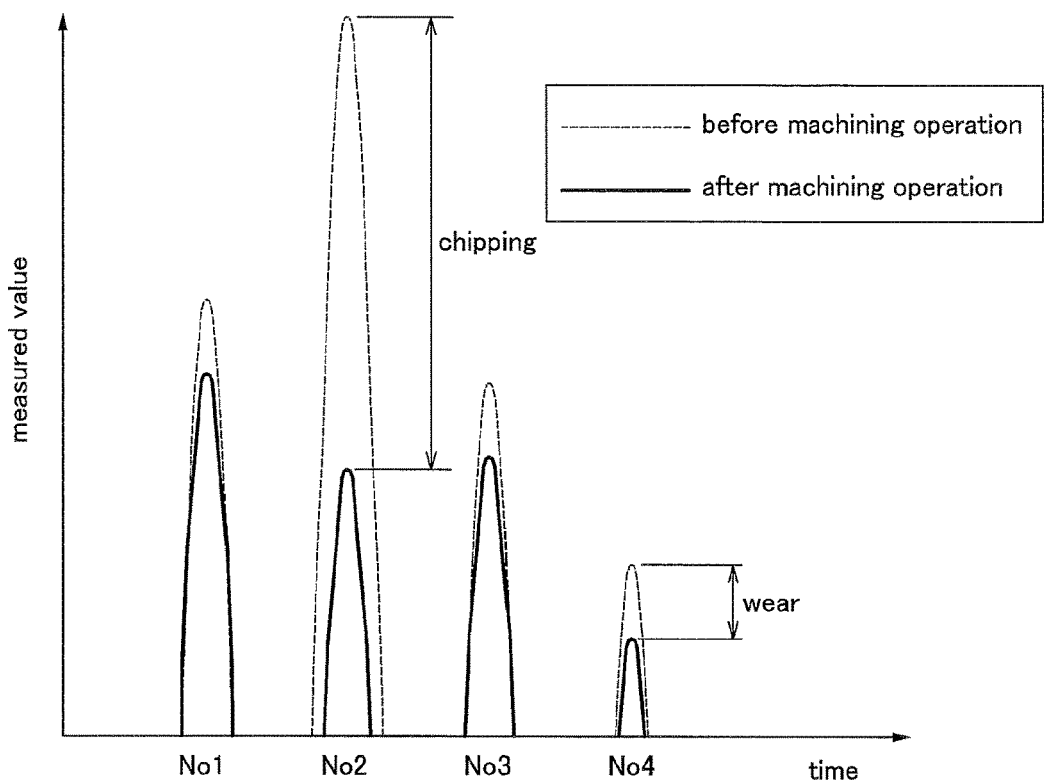
FIG. 6 is a graph showing comparison of runout of each cutting edge before/after use.

FIG. 6 shows a result of measurement of such runout of the cutting edge 4b on one end side in the radial direction, for a 6 mm φ end mill. In FIG. 6, the dot line represents the measurement result before machining operation and the solid line represents the measurement result after machining operation.

According to the measurement result before machining operation, the No. 2 cutting edge 4b had the largest measurement value, which was 1.020 mm. Whereas, the minimal measurement value which was 0.960 mm was obtained from No. 4 cutting edge 4b. Therefore, from this difference, it can be seen that the "runout" before the machining operation was 0.060 mm.

On the other hand, according to the measurement result after working, the No. 1 cutting edge 4b had the largest measurement value, which was 0.980 mm. Whereas, the minimal measurement value which was 0.950 mm was obtained from No. 4 cutting edge 4b. Therefore, from this difference, it can be seen that the "runout" after the machining operation was 0.030 mm. This means that the runout dropped to a half of that before the machining operation.

However, when attention is paid to No. 2 cutting edge 4b, its measurement value was 1.020 mm before the machining operation and this became 0.969 mm after the machining operation, showing decrease of 0.051 mm. As to No. 1, No. 3 and No. 4 cutting edges 4b, in all of these, measurements of 0.010 mm shorter were found after the machining operation, as compared with before machining operation. From this result, in this embodiment, it was found that as for No. 1, No. 3 and No. 4, the measurement values became smaller due to wear by machining operation. On the other hand, as for No. 2 cutting edge 4b, the decrease of the measurement value was sharp, so it was found that this was due not to wear, but to chipping of the cutting edge 4b. Incidentally, for determination of whether chipping or not, a certain setting of threshold value according to the size of the tool 4 is possible. In the case of the 6 mm φ end mill, as the threshold value of chipping, 0.020 mm can be set. Incidentally, in case of chipping, the contour of the cutting edge 4b may not be confined within the detection range of the line sensor 8, so there may not be provided a peak which should be detected periodically. Such threshold value can be set appropriately by an interval of measurement such as a number of machined, a machining line length, etc.

FIG. 6 shows an example in which one end position of the tool 4 in the radial direction (X-axis direction) was measured. However, in this embodiment, since the first line sensor 8a is provided in the axial direction (Z-axis direction) of the tool 4, a runout width of the leading end 4a of the cutting edge 4b in the axial direction can be measured also, in addition to the radial direction. With this, as shown in FIG. 7, chipping of the cutting edge 4b in the axial direction (Z-axis direction) can be specified.

Second Embodiment

Figure 8:
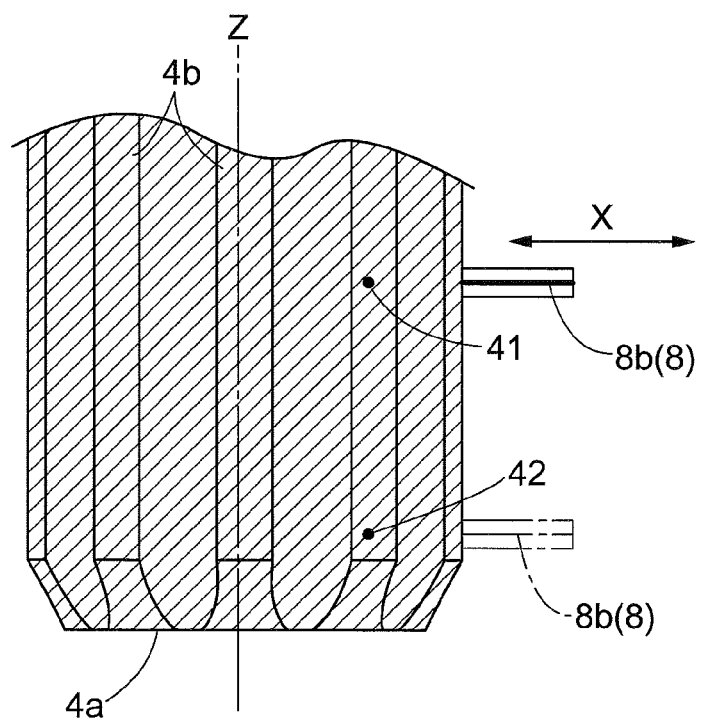
FIG. 8 is a view showing an example of providing a plurality of measurement portions in a cutting edge.

As the measurement position in the tool 4, for each of the plurality of cutting edges 4b, two positions can be provided along the extending direction of the cutting edge 4b. FIG. 8 shows an example in which measurement portions 41, 42 at such two positions are provided in the direction of the rotational axis Z of the cutting edge 4b. For instance, the first measurement portion 41 is provided at a "normal position" away from a portion used for machining, thus not suffering from wear, whereas the second measurement portion 42 is provided in the vicinity of the leading end 4a used in the machining operation.

With using a difference between the two measured contour positions as a "runout width", if this runout width exceeds a preset threshold value, it is determined that the shape of the cutting edge 4b at issue is abnormal.

Figure 9:
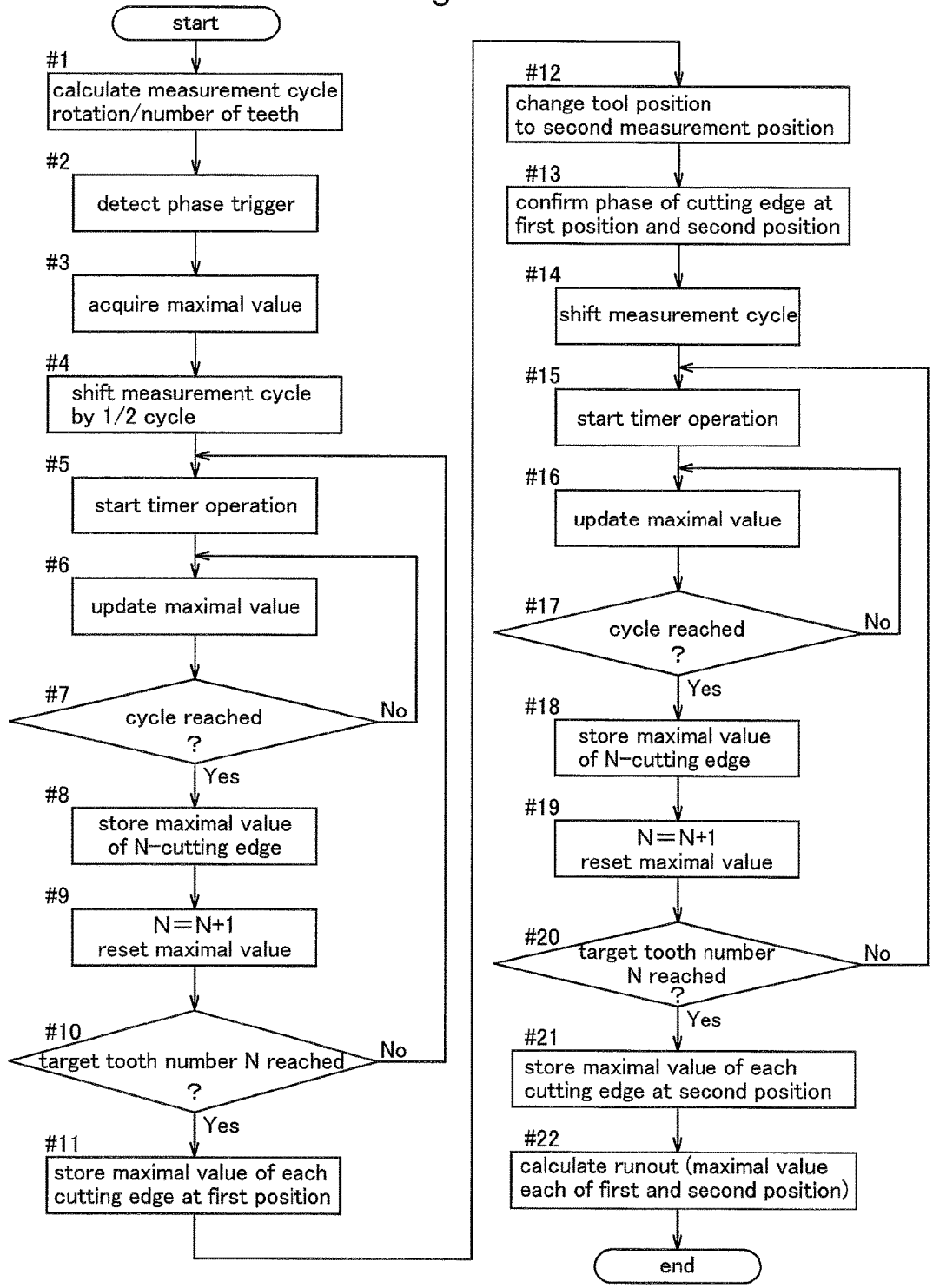
FIG. 9 is a flowchart for effecting runout determination by measuring a plurality of portions of each cutting edge.

FIG. 9 shows a flowchart in this mode of measurement. In the case of this measurement, in addition to the one shown in FIG. 5, the contour position of the cutting edge is measured at a different position of the tool 4. For instance, in the first measurement, measurement is done on an unused portion in the cutting edge of the tool 4 located at a position away from its leading end 4a. The measurement at this first determination portion 41 corresponds to steps #1 through step #11 in FIG. 9. In particular, at step #11, in the case of FIG. 5, the calculation of runout at the cutting edge 4b was effected. Whereas, here, for the contour position of each cutting edge 4b at this first measurement portion 41, a maximal value thereof will be stored.

At step #12 subsequent thereto, the position of the tool 4 is moved. This position, as shown in FIG. 8, is the second measurement portion 42 provided at the leading end 4a of the tool 4. Next, the process checks relative positional relationship between the phase of each cutting edge 4b at the second measurement portion 42 and the phase of each cutting edge 4b at the first measurement portion 41 measured previously. For instance, as is the example shown in FIG. 8, if each cutting edge 4b is in parallel with the direction of the rotational axis Z of the tool 4, the rotational phase of the respective cutting edge 4b will be same at the first measurement portion 41 and the second measurement portion 42. Therefore, in this case, the phase checking of each cutting edge 4b at the first measurement portion 41 and the second measurement portion 42 can simply be checking of these rotational phases being same as each other. There is no need for shifting the measurement cycle at step #14.

If the phase of the cutting edge 4b at the second measurement portion 42 can be grasped, at steps from #15 to #21, like the measurement at first measurement portion 41, the contour position of each cutting edge 4b will be measured and a maximal value of the contour position of each cutting edge 4b at the second measurement portion 42 will be stored.

Thereafter, at step #22, the process obtains a difference between the measurement result at the first measurement portion 41 and the measurement result at the second measurement portion 42 and calculates how the contour position of each cutting edge 4b has changed before/after machining operation. For instance, in the case of 6 mm φ end mill, 0.020 mm will be set as the threshold value, as described above. And, if the value is below this, the condition is determined as a normal wear. Whereas the value exceeds the threshold value, the condition is determined as a chipping.

In this way, by comparing runout widths between a plurality of measurement portions in the tool 4, is possible to compare the shape of normal position away from a working portion and a portion used for machining operation in the cutting edge 4b, for instance, so that shape abnormality of the tool 4 can be detected easily without effecting measurement at different timings.

Figure 10:
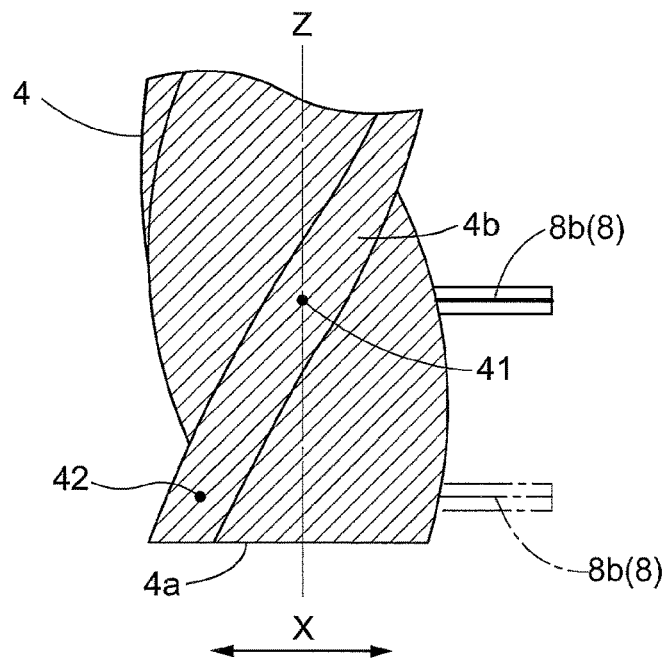
FIG. 10 is a view showing an example of providing a measurement portion at a twisted cutting edge.

Incidentally, in case the cutting edge 4b is twisted in the rotational direction, as shown in FIG. 10, even for the same cutting edge 4b, the phase at the first measurement portion 41 and the phase at the second measurement portion 42 will be different from each other. Therefore, a phase difference in the rotational direction between the first measurement portion 41 and the second measurement portion 42 will be checked at step #13 in advance, and then a difference of measured values between the first measurement portion 41 and the second measurement portion 42 will be calculated.

Other Embodiments

Figure 11:
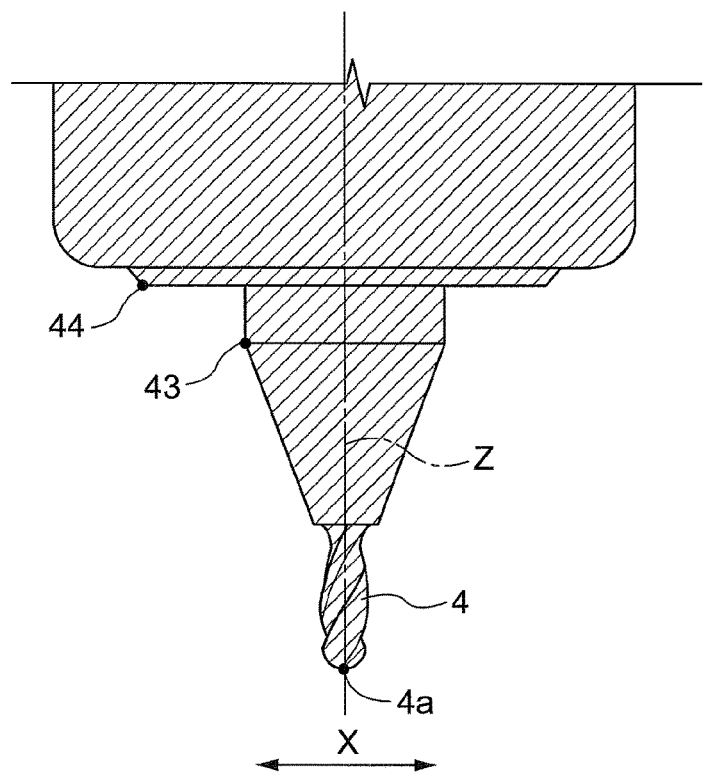
FIG. 11 is an explanatory view of a reference position in a direction of rotational axis (Z axis).

In case the shape of the tool 4 is measured in the direction of the rotational axis Z of the tool 4, as shown in FIG. 11, an intermediate portion 43 of the tool 4 where the shank diameter begins to diminish, or a base end portion 44 of the tool 4 can be set as a reference position. As provided in the instant embodiment, by setting the intermediate portion 43 or the base end portion 44 of the tool 4, i.e. a portion that does not come into contact with an object to be machined, as a reference position for comparison between before/after machining operation, accuracy of the measurement value will be stabilized.

INDUSTRIAL APPLICABILITY

The present invention can be widely used for shape measurement of various tools.

REFERENCE SIGNS LIST

1: imaging section
2: controller
4: tool
4b: cutting edge
5: light projecting section
6: light receiving section
6a: light receiving lens
8: line sensor
8a: first line sensor
8b: second line sensor
9: light receiving face
21: calculation section
31: phase detection section
100: tool shape measurement apparatus
A-C: first through third areas
L: irradiation light

The invention claimed is:

1. A tool shape measuring apparatus configured to measure a shape of a tool having a plurality of cutting edges in an outer circumference thereof, the apparatus comprising:
   a light projecting section for emitting an irradiation light to the tool;
   a light receiving section disposed opposite the light projecting section across the tool therebetween, the light receiving section being configured to receive the irradiation light through a lens, the light receiving section being set at a position where a contour of the tool is imaged by the lens;
   a calculation section for calculating a contour position of the tool based on a detection signal of the light receiving section;
   wherein the light receiving section includes a light receiving face perpendicular to an optical axis of the lens, and in the light receiving face, there are disposed a plurality of line sensors arranged in different directions from each other, each line sensor having a plurality of sensor elements arranged in one direction;
   wherein the respective line sensor is disposed across a first area not reached by the irradiation light as being completely blocked by the tool, a second area disposed adjacent the first area and reached by the irradiation light with a portion thereof being blocked, and a third area disposed adjacent the second area and reached by the irradiation light not blocked at all; and
   wherein the calculation section checks change occurring in output states of the line sensor associated with rotation of the tool and specifies a contour position of the tool based on a center position in the second area when the number of the sensor elements included in the second area becomes minimal.

2. The tool shape measuring apparatus of claim 1, wherein the line sensors include a first line sensor disposed parallel with the rotational axis of the tool and a second line sensor disposed at a right angle relative to the first line sensor about a position adjacent one of opposed ends of the first line sensor, which one end is closer to a base end portion of the tool.

3. The tool shape measuring apparatus of claim 1, wherein:
   the apparatus further comprises a phase detection section for recognizing a rotational phase of the tool;
   a contour position of each one of the plurality of cutting edges is measured at different timings before and after a machining operation and a difference between the two measured contour positions calculated based on results of the measurements is set as a runout width; and
   if the runout width exceeds a preset threshold value, the shape of the cutting edge is determined abnormal.

4. The tool shape measuring apparatus of claim 1, wherein:
   a contour position of each one of the plurality of cutting edges is measured at two positions along the extending direction of the cutting edge and a difference between the two measured contour positions calculated based on results of the measurements is set as a runout width; and if the runout width exceeds a preset threshold value, the shape of the cutting edge is determined abnormal.

5. The tool shape measuring apparatus of claim 1, wherein:

for the calculation of the contour position of the tool by the calculation section;

there is provided an input section for inputting a number of teeth of the tool;

the calculation section calculates a measurement cycle for each cutting edge in accordance with a preset measurement rotational speed of the tool and the number of teeth thereof;

the line sensors measure a movement of the contour position;

at a timing when the contour position moves to one side in a longitudinal direction of the line sensors and then reverses in the opposite direction, a position of this reversal is set as a determined contour position;

a measurement timing is set such that with reference to a rotational phase of the tool at the timing of acquisition of the determined contour position, the measurement cycle is shifted by a half cycle to provide a switchover phase for measurement starting and measurement ending;

the determined contour position is obtained at least one time for each one of the plurality of cutting edges; and of the determined contour positions of the respective cutting edge, a runout of the tool is measured based on a difference between a maximal contour position most distant from the rotational axis of the tool and a minimal contour position closest to the rotational axis.

* * * * *